US012695967B2

(12) United States Patent
Roth

(10) Patent No.: US 12,695,967 B2
(45) Date of Patent: Jul. 28, 2026

(54) METHOD FOR PRE-CONDITIONING A TEMPERATURE-CONTROLLABLE SENSOR COVER, COMPUTING DEVICE FOR A VEHICLE, COMPUTER-READABLE STORAGE MEDIUM, TEMPERATURE-CONTROLLABLE SENSOR COVER SYSTEM, AND VEHICLE

(71) Applicant: Bayerische Motoren Werke Aktiengesellschaft, Munich (DE)

(72) Inventor: Jonathan Roth, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 19/124,334

(22) PCT Filed: Sep. 29, 2023

(86) PCT No.: PCT/EP2023/076997
§ 371 (c)(1),
(2) Date: Apr. 25, 2025

(87) PCT Pub. No.: WO2024/088688
PCT Pub. Date: May 2, 2024

(65) Prior Publication Data
US 2026/0172658 A1      Jun. 18, 2026

(30) Foreign Application Priority Data
Oct. 28, 2022    (DE) ..................... 10 2022 128 734.3

(51) Int. Cl.
*H04N 7/18*          (2006.01)
*G05D 23/19*         (2006.01)
(Continued)

(52) U.S. Cl.
CPC ......... *H04N 23/52* (2023.01); *G05D 23/1917* (2013.01); *G01W 1/10* (2013.01)

(58) Field of Classification Search
CPC ...... H04N 7/18; H04N 23/52; G05D 23/1917; G01W 1/10
(Continued)

(56) References Cited

U.S. PATENT DOCUMENTS 6,414,623 B1 *   7/2002   Ashihara ............... G01S 7/4004
                                                                   342/173
10,921,810 B2 *   2/2021   Kutila ............. B60W 30/18163
(Continued)

FOREIGN PATENT DOCUMENTS

DE       10 2010 040 132 A1     3/2012
DE       10 2013 226 631 A1     6/2015
(Continued)

OTHER PUBLICATIONS

International Search Report (PCT/ISA/210) issued in PCT Application No. PCT/EP2023/076997 dated Dec. 8, 2023 with English translation (6 pages).
(Continued)

*Primary Examiner* — Trang U Tran
(74) *Attorney, Agent, or Firm* — Crowell & Moring LLP

(57)          ABSTRACT

A method for pre-conditioning a temperature-controllable sensor cover of an environmental sensor of a vehicle includes the steps of: determining a route region which describes a region of a future environment of the vehicle along a predetermined route, receiving environmental data which comprise data relevant to deposition of precipitation on the sensor cover within the route region, and outputting a heating signal for pre-conditioning the temperature-controllable sensor cover. The heating signal is output according to the environmental data.

11 Claims, 4 Drawing Sheets

(51) Int. Cl.
  *H04N 23/52*      (2023.01)
  *G01W 1/10*       (2006.01)
(58) Field of Classification Search
  USPC ........................................................ 348/148
  See application file for complete search history.

(56)             References Cited

U.S. PATENT DOCUMENTS

| | | | | |
|---|---|---|---|---|
| 11,333,519 B2 * | 5/2022 | McGill | .............. | G01C 21/3614 |
| 12,313,425 B2 * | 5/2025 | Senninger | ............ | G05D 1/0214 |
| 2019/0077407 A1 * | 3/2019 | Miura | ................. | B60W 30/146 |
| 2019/0377064 A1 * | 12/2019 | Scheske | .................. | G01S 7/497 |
| 2022/0187414 A1 | 6/2022 | Won | | |
| 2022/0317245 A1 | 10/2022 | Roth | | |

FOREIGN PATENT DOCUMENTS

| | | | |
|---|---|---|---|
| DE | 10 2015 220 660 B3 | 3/2017 |
| DE | 10 2016 006 200 A1 | 11/2017 |
| DE | 10 2021 213 900 A1 | 6/2022 |
| DE | 10 2021 108 439 A1 | 10/2022 |
| EP | 3 494 445 B1 | 11/2020 |

OTHER PUBLICATIONS

German-language Written Opinion (PCT/ISA/237) issued in PCT Application No. PCT/EP2023/076997 dated Dec. 8, 2023 with English translation (17 pages).
German language Search Report issued in German Application No. 10 2022 128 734.3 dated Jun. 6, 2023 with partial English translation (12 pages).

* cited by examiner

METHOD FOR PRE-CONDITIONING A TEMPERATURE-CONTROLLABLE SENSOR COVER, COMPUTING DEVICE FOR A VEHICLE, COMPUTER-READABLE STORAGE MEDIUM, TEMPERATURE-CONTROLLABLE SENSOR COVER SYSTEM, AND VEHICLE

BACKGROUND AND SUMMARY

The present invention relates to a method for pre-conditioning a temperature-controllable sensor cover of an environmental sensor of a vehicle. In addition, the present invention relates to a computing device for a vehicle for performing such a method. Furthermore, the present invention also relates to a computer-readable storage medium, a temperature-controllable sensor cover system for an environmental sensor of a vehicle and to a vehicle.

Almost all modern vehicles today have environmental sensors such as cameras, radar, lidar or ultrasonic sensors. Such sensors are used to acquire information about the environment of the vehicle. Various assistance systems can be run based on the acquired environmental information. These can include cruise control systems, lane change assistant systems and collision warning systems, for example. In order to protect environmental sensors from environmental influences, in particular weather effects, environmental sensors have sensor covers. Radar sensors, for example, have so-called radomes. The radome forms a cover and is permeable to the electromagnetic radiation of the radar sensor. Radomes can be integrated into the outer skin of the vehicle, for example in the fender or the radiator grille.

At temperatures close to or below the freezing point of water, precipitation can accumulate on the sensor covers of the environmental sensor. Such a deposition of precipitation can affect the performance of the environmental sensor. In order to free a radome from a deposition of precipitation, for example, radomes are equipped with heating elements. The heating elements can be designed, for example, as a heating foil and/or as a heating wire. Typically, the heating wire runs orthogonal to the polarization direction of the electromagnetic radiation of the radar sensor.

Reliable detection of weather-related conditions is essential for success when temperature controlling the sensor cover or de-icing a deposition of precipitation using the heating elements of the sensor cover. Nowadays, sensor covers in the vehicle region are typically temperature-controllable in the range of −5° to +5°. In addition, control systems, in particular for radome heating, are also known.

The publication DE 10 2021 108 439 A1 describes, for example, a method for operating a heating device for temperature controlling a radome of a radar sensor of a vehicle, having the steps: receiving environmental data describing an environment of the vehicle and/or at least one region of the radome of the vehicle; detecting a deposition of precipitation on the radome based on the environmental data; outputting a heating signal to the heating device for temperature controlling the radome depending on the detected deposition of precipitation, wherein the environmental data is received as image data from at least one camera of the vehicle, and the precipitation in the environment and/or at the region of the radome is detected based on the image data.

The object of the present invention is to demonstrate a solution as to how the temperature control of a sensor cover of an environmental sensor of a vehicle can be improved.

This object is achieved by a method, a computing device, a computer-readable storage medium, a temperature-controllable sensor cover system, and a vehicle having the features according to the independent claims. Advantageous extensions of the present invention are specified in the dependent claims.

A method according to the invention for pre-conditioning a temperature-controllable sensor cover of an environmental sensor of a vehicle comprises determining a route region which describes a region of a future environment of the vehicle along a predetermined route. In addition, the method according to the invention comprises receiving environmental data which comprise data relevant to a deposition of precipitation on the sensor cover within the route region. Finally, the method according to the invention comprises outputting a heating signal for pre-conditioning the temperature-controllable sensor cover, wherein the heating signal is output depending on the environmental data.

The method can be carried out, for example, by means of a computing device. The computing device can be designed, for example, in the form of at least one electronic control unit of the vehicle, which comprises one or more programmable processors. In addition, the computing device may have a computer-readable storage medium on which a computer program is stored. The computer program can be executed on the computing device in order to perform corresponding method steps, such as determining the route region.

The method according to the invention can thus be used for pre-conditioning a temperature-controllable sensor cover of the environmental sensor of the vehicle. By means of the method according to the invention, the sensor cover is intended to be temperature-controlled prior to the occurrence of a deposition of precipitation in such a way that a probability of the occurrence of the deposition of precipitation is reduced a priori. The invention is therefore based on the idea of analyzing the future environment of the vehicle, for example by means of weather data and/or fleet data.

To do this, a route region is first determined. The route region can describe a region of a future environment of the vehicle along a predetermined route. For example, the predetermined route can be a route specified by a navigation system. It is also conceivable that the predetermined route is the most likely route to be used. For example, the region of the future environment of the vehicle can be a section of the predetermined route. It can also be a region surrounding the predetermined route.

The route region can be, for example, the next 5, 10, 20, or 30 kilometers of the predetermined route. Alternatively or in addition, the route region can also be a tubular section along the next 5, 10, 20 or 30 kilometers. It is also conceivable that the route region is also a region surrounding the subsequent 5, 10, 20 or 30 kilometers of the route. However, it is not necessary that these are the directly subsequent 5, 10, 20 or 30 kilometers. For example, it is also conceivable that the route region describes the future environment in 5 kilometers to, for example, 30 kilometers (i.e., over a length of 25 kilometers). In general terms, the route region is freely definable. The examples listed above are therefore by no means exhaustive. Furthermore, the numerical values for the route regions are only used for clarification purposes.

It may also be advantageous if the route region is determined depending on an external temperature and/or a speed of the vehicle. For example, a lower external temperature may require longer pre-conditioning. Likewise, a higher speed of the vehicle may require a longer pre-conditioning due to an increased airflow velocity of the sensor cover. As a result, it may be necessary for the environmental data to be available at an early stage. Therefore the route region can have a larger spatial extent at a higher speed of the vehicle and/or at a lower external temperature. In addition, in the event of a high vehicle speed and/or a low external temperature, the route region can be located further away from the vehicle. This ensures that sufficient time is always available for temperature controlling or pre-conditioning the sensor cover.

When receiving environmental data, data relevant to the route region can be received. The relevant data can be, for example, weather data from an online database, a warning service or the like. It is also conceivable that the relevant data is data from a vehicle fleet or at least one other vehicle.

Data relevant for deposition of precipitation within the specific route region can therefore be data describing precipitation, temperature or general weather data in the route region. In addition or alternatively, fleet data can also represent data relevant to a deposition of precipitation within the route region. If, for example, it is known that precipitation is deposited on the sensor covers of other vehicles, or that their environmental sensors signal a blockage or that other vehicles are temperature controlling their sensor cover, this information can be extremely important.

The sensor cover of the environmental sensor of the vehicle can thus be pre-conditioned depending on the environmental data received. For this purpose, a heating signal can be output to the heating element of the sensor cover. This allows the sensor cover to be prepared for an impending deposition of precipitation. In this way, a probability of deposition of precipitation in the route region can be reduced. As a result, sensor availability can be increased. Assistance systems that use the data of the environmental sensor can thus be offered more reliably and with greater availability to the driver/user of the vehicle.

According to the invention, the environmental sensor can be designed as a camera, as a radar, lidar or ultrasonic sensor. Consequently, the sensor cover can be a panel, a radome, a lidar cover or a lidome or the like. The sensor cover can be integrated in an outer skin of the vehicle or in corresponding trim components of the vehicle (for example a windscreen, fender, radiator grille or the like).

It can be advantageous if, based on the environmental data, a deposition of precipitation measure is additionally determined, which describes a probability of a deposition of precipitation at the temperature-controllable sensor cover within the route region, and the heating signal is output depending on the deposition of precipitation measure. The deposition of precipitation measure can be advantageous in particular when the environmental data comprise numerous data relevant for a deposition of precipitation at the sensor cover within the route region, which in turn can come from different sources. It can also be advantageous if the environmental data itself only comprises information of a general nature (e.g., temperature, probability of precipitation, etc.), but not actual information about an impending deposition of precipitation.

The deposition of precipitation measure can also be understood as a probability of deposition of precipitation. However, in contrast to a probability, the deposition of precipitation measure can be unnormalized, have negative signs and/or be unlimited. If weather data is received as the environmental data, for example, a probability of a deposition of precipitation and thus the deposition of precipitation measure can be determined based on the weather data. If, for example, the deposition of precipitation measure exceeds a predetermined threshold value, the heating signal can be output depending on the deposition of precipitation measure exceeding the threshold value.

Furthermore, it can be advantageous if additional plausibility data are received from at least one sensor of the vehicle, wherein the plausibility data describes characteristic parameters for precipitation in a current environment of the vehicle, and the heating signal is output depending on the plausibility data. The use of additional plausibility data can improve the pre-conditioning of the sensor cover. The plausibility data can be used to detect incorrect environmental data or to prevent the output of the heating signal due to incorrect environmental data. This can also improve energy efficiency. In other words, unnecessary pre-conditioning can be prevented. A level of cloud cover, a humidity, an ambient brightness or the like can be considered as characteristic parameters, for example.

It can be advantageous in this context if the plausibility data comprise image data from a camera of the vehicle, wherein the image data describe at least a region of the sky and/or an ambient brightness. Image data can, for example, detect whether cloud cover is present in the sky. Cloud cover in the sky can indicate an imminent precipitation. Furthermore, cloud cover in the sky can cause the ambient brightness to drop. If the sky darkens due to cloud cover, this can indicate imminent precipitation, which can lead to a deposition of precipitation on the sensor cover. Such information can thus be used to check the plausibility of the environmental data. In addition, such information can be used in advance of the output of the heating signal for pre-conditioning the temperature-controllable sensor cover.

In addition or alternatively, the plausibility data may also comprise data from a light sensor of the vehicle, wherein the data of the light sensor describes an ambient brightness. Modern vehicles today comprise rain-light sensors, which are used to control the windscreen wipers of a vehicle. In addition, rain-light sensors or light sensors can be used to control the vehicle lighting. It is therefore proposed to use the data of such a light sensor of the vehicle as plausibility data. A reduction in the ambient brightness can indicate imminent precipitation or a current precipitation.

In addition, the plausibility data may additionally or alternatively comprise temperature data from a temperature sensor of the vehicle, wherein the temperature data describes an external temperature of the current environment of the vehicle. The external temperature of the current environment of the vehicle can be one of the most important parameters for the temperature control of the radome. For a future deposition of precipitation on the radome within the route region, the external temperature can represent an important plausibility parameter. For example, it is conceivable that the environmental data comprises precipitation data. Whether precipitation is deposited on the sensor cover within the route region as a result of the precipitation data can depend in particular on the external temperature. The temperature data can thus be used for plausibility checking in advance of the output of the heating signal. If precipitation is unlikely due to the plausibility data, the outputting of the heating signal can be prevented. The outputting of the heating signal can also be prevented, in particular if, according to the environmental data, a pre-conditioning of the sensor cover would be desirable.

It may also be advantageous if the environmental data comprises weather data describing the current weather within the route region. Weather data that describes a current weather within the route region can be retrieved, for example, from an online weather database. If the weather data shows that it is snowing in the route region, for example, the sensor cover can be pre-conditioned or temperature-controlled before reaching the route region, in order to prevent precipitation or snow from accumulating in advance or to reduce the effects of depositions of precipitation in advance.

However, it is also contemplated that the environmental data comprises weather forecast data, which describes a predicted weather within the route region. The latter can be particularly advantageous if the route region describes a region of the vehicle not directly in front of the vehicle, but, for example, a future environment of the vehicle at a distance of 10 kilometers. For example, if the vehicle moves at an average speed of 50 km/h, the vehicle will not reach the route region for around 12 minutes. During this time, the weather can change significantly. Therefore, it can be advantageous if not (only) the current weather in the route region is taken into account, but additionally or alternatively the weather predicted in the route region in 12 minutes. Overall, the pre-conditioning of the sensor cover can be further improved.

Weather forecast data comprising environmental data can be beneficial even if the route region extends over a corresponding distance. For example, if a spatial extension of the route region is 20 kilometers and the vehicle moves at 60 km/h, the vehicle is within the route region for 20 minutes. During this time, precipitation can accumulate, which is why the predicted weather for the next 20 minutes can be relevant for a deposition of precipitation in the route region.

Finally, it may also be advantageous if the environmental data comprises fleet data which describes a heating strategy of at least one further vehicle and/or a vehicle fleet within the route region. In current practice, vehicles from individual manufacturers communicate continuously with a so-called backend and exchange numerous data via this backend. An additional exchange via an active heating of the sensor cover, a heating power and/or a heating strategy allows the vehicle to be informed about the need for temperature control of the sensor cover in the route region at an early stage. As a result of the fleet data, the sensor coverage can be pre-conditioned in advance of reaching the route region.

Instead of communication via a backend, the vehicle may be connected to at least one other vehicle via, for example, vehicle-to-vehicle communication, referred to in technical terminology as V2V communication. If another vehicle passes the vehicle, the heating strategy of the previous minutes or kilometers and thus within the route region can be transmitted to the vehicle, for example. Depending on the heating strategy transmitted in this way, a decision can be made as to whether pre-conditioning of the radome is necessary. It is also conceivable that such data can be used in addition or alternatively as plausibility data.

It is also generally contemplated that the heating strategies transmitted in this way are averaged across the other vehicles. If, for example, 80% of the vehicles in the route region have their sensor cover temperature-controlled, the sensor cover of the vehicle can be pre-conditioned. In general, the sensor cover of the vehicle can thus be pre-conditioned when a predetermined percentage of the further vehicles have their sensor cover temperature-controlled in the predetermined route region.

A computing device according to the invention for a vehicle is configured to perform a method according to the invention and the advantageous embodiments thereof. The computing device may be designed, for example, as an electronic control unit which comprises one or more programmable processors. A computer-readable storage medium according to the invention comprises commands, which during the execution by a computing device cause the computer to perform a method according to the invention and the advantageous embodiments thereof.

A temperature-controllable sensor cover system according to the invention for an environmental sensor of a vehicle comprises a computing device according to the invention, a sensor cover for the environmental sensor and a heating element for temperature controlling or pre-conditioning the sensor cover. The heating element can be designed as a heating foil and/or as a heating wire, for example. In the case of a radar sensor as an environmental sensor, the heating wires of the heating element preferably run substantially orthogonal to a polarization of the electromagnetic radiation of the radar sensor.

A vehicle according to the invention comprises a temperature-controllable sensor cover system according to the invention. The vehicle can in particular be designed as a passenger car.

A further aspect of the invention relates to a computer program comprising commands which, when the computer program is executed by a computing device, cause it to perform the method according to the invention and the advantageous embodiments thereof.

The preferred embodiments presented in relation to the method according to the invention and their advantages apply mutatis mutandis to the computing device according to the invention, to the computer-readable storage medium according to the invention, to the temperature-controllable radome system according to the invention and to the vehicle. Furthermore, the preferred embodiments presented in relation to the method according to the invention and their advantages also apply to the computer program according to the invention.

Additional features of the invention arise from the claims, the figures and the description of the figures. The features and feature combinations cited in the description above, and the features and feature combinations cited in the description of the figures below and/or shown in the figures alone are applicable not only in the respective combination indicated but also in other combinations or in isolation, without departing from the scope of the invention.

The invention will now be described in greater detail based on preferred exemplary embodiments and by reference to the attached drawings.

In the figures, identical or functionally equivalent elements are indicated by identical reference marks.

DETAILED DESCRIPTION OF THE DRAWINGS

Figure 1A:
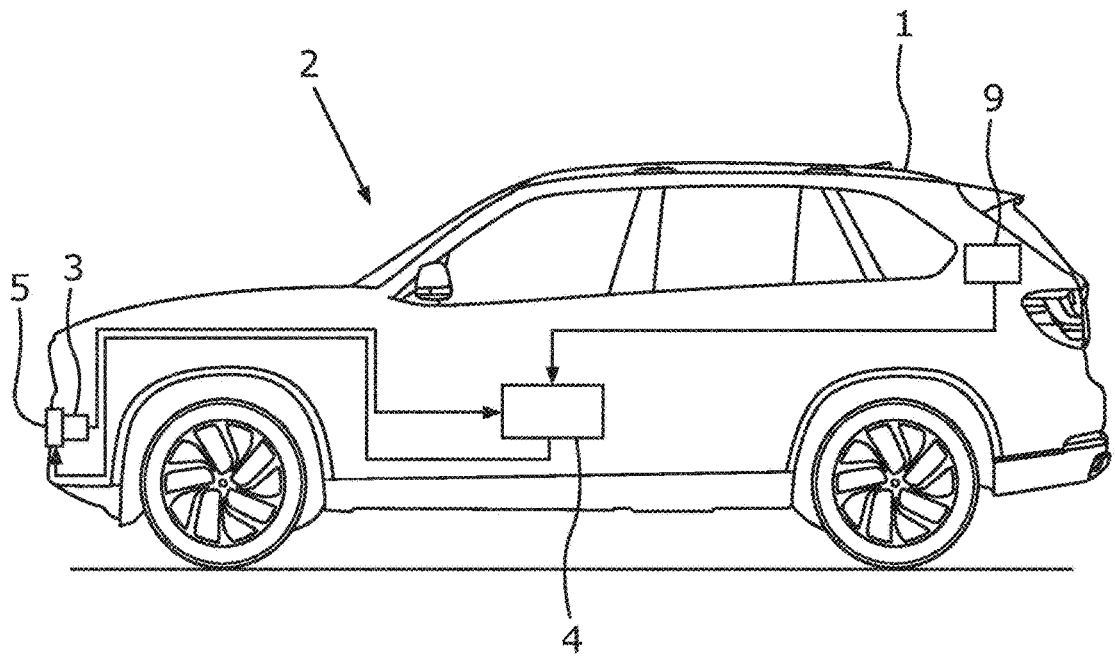
FIGS. 1a, 1b are schematic representations of a vehicle comprising a temperature-controllable sensor cover system for an environmental sensor of the vehicle.

FIG. 1a shows a schematic representation of a vehicle 1 in a side view. The vehicle 1 is designed as a passenger car.

The vehicle 1 comprises a temperature-controllable sensor cover system 2 for an environmental sensor 3, which is shown in the following exemplary embodiments as a temperature-controllable radome system 2 for a radar sensor 3 of the vehicle 1. The temperature-controllable radome system further comprises a computing device 4 and a radome 5. Furthermore, the temperature-controllable sensor cover system 2 or the temperature-controllable radome system 2 comprises a heating element 6 for the sensor cover 5 of the environmental sensor 3 or for the radome 5 of the radar sensor 3. The computing device 4 is configured to determine a route region 7. The route region 7 can describe a region of a future environment of the vehicle along a predetermined route 8. The predetermined route can be predetermined, for example, by the road network or a navigation system.

The computing device 4 is also configured to receive environmental data. In the embodiment of FIG. 1, the environmental data can be received in an exemplary manner from a receiving module 9. The receiving module 9 can receive, for example, weather data from an online database, fleet data from a backend, data from at least one other vehicle, or the like. The computing device 4 is finally also configured to output a heating signal for pre-conditioning the temperature-controllable radome 5 or the temperature-controllable sensor cover 5. The heating signal can be output to the heating element 6 of the radome 5 or the sensor cover 5. By means of the heating signal, the temperature-controllable radome 5 or the temperature-controllable sensor cover 5 can be pre-conditioned. Pre-conditioning refers to the preliminary temperature control of the radome 5 or the sensor cover in order to prevent a future deposition of precipitation 10 as far as possible.

Figure 1B:
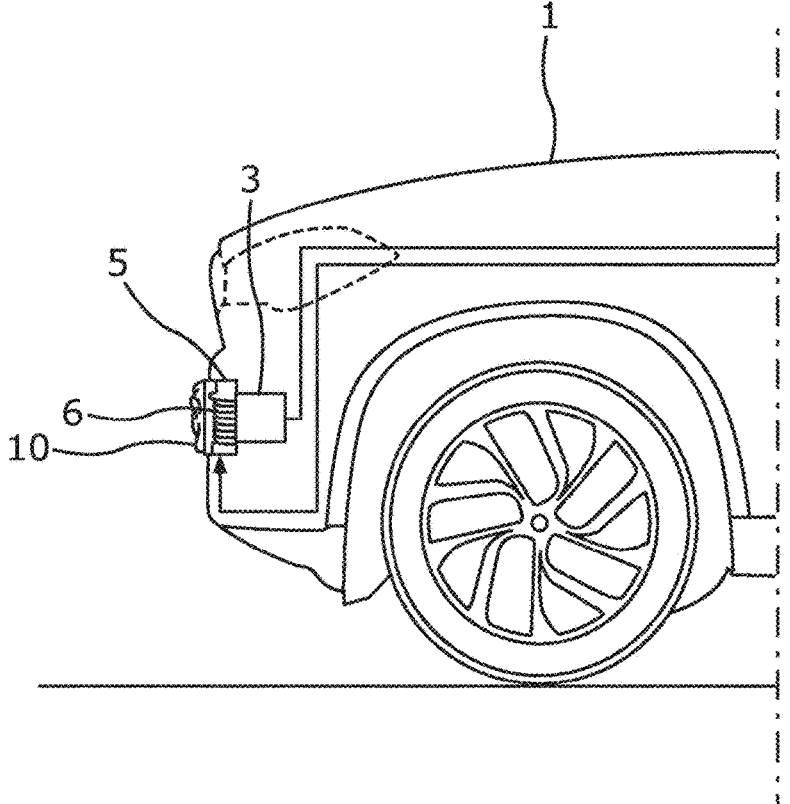

FIG. 1*b* shows the radar sensor 3 or the environmental sensor 3 of the vehicle 1 in an enlarged view, as well as the radome 5 or the sensor cover 5 together with heating element 6 according to FIG. 1*a* also in an enlarged view. Furthermore, in FIG. 1*b*, a deposition of precipitation 10 is shown on the radome 5 of the radar sensor 3 or on the sensor cover 5 of the environmental sensor. Such a deposition of precipitation 10 can occur within the route region 7, for example, due to precipitation.

Figure 2:
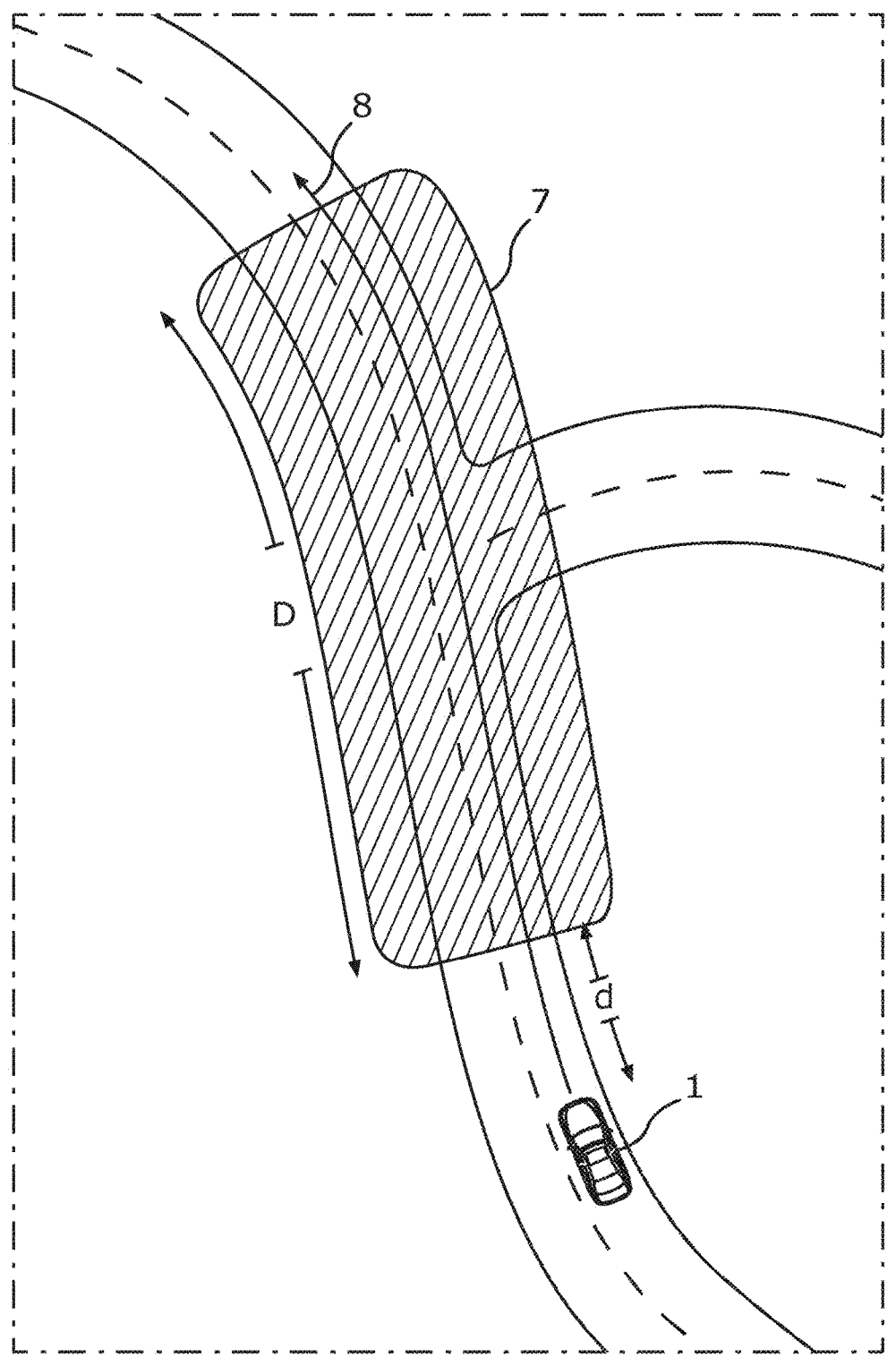
FIG. 2 is a schematic representation of a route region which describes a region of a future environment of the vehicle along a predetermined route.

FIG. 2 shows a schematic route region 7, which describes a region of a future environment of the vehicle 1 along a predetermined route 8. The route region 7 can start directly in front of the vehicle 1 and extend over a predetermined distance. In the embodiment of FIG. 2, however, the route region 7 does not begin for a predetermined interval distance d. The predetermined interval distance d can be, for example, 5 kilometers. The route region 7 can extend over a distance D, for example. The route region 7 is shown in FIG. 2 in the form of a tubular section along the future trajectory of the vehicle 1.

The predetermined route 8 can be predetermined on the basis of a destination entered by the driver of the vehicle 1 into a navigation system of the vehicle 1. However, the predetermined route 8 can also be determined on the basis of the most likely route. For example, if the vehicle 1 is on a country road, it is conceivable that it will probably follow the road for a longer period of time.

Environmental data can now be received for the route region 7. The environmental data comprises data relevant to a deposition of precipitation at the radome 5 or the sensor cover 5 of the vehicle 1 within the route region 7, such as weather data, temperature data or the like. Based on this data, which is relevant for a deposition of precipitation on the radome 5 of the radar sensor 3 or the sensor cover 5 of the environmental sensor 3, a deposition of precipitation measure can be determined, which describes a probability of a deposition of precipitation 10 on the radome 3 of the radar sensor 3 or the sensor cover 5 of the environmental sensor 5 within the route region 7. The heating signal can thus be output to the heating element 6 depending on the deposition of precipitation measure and/or depending on the environmental data. As a result, the radome 5 or the sensor cover 5 can be pre-conditioned or pre-temperature controlled.

Figure 3:
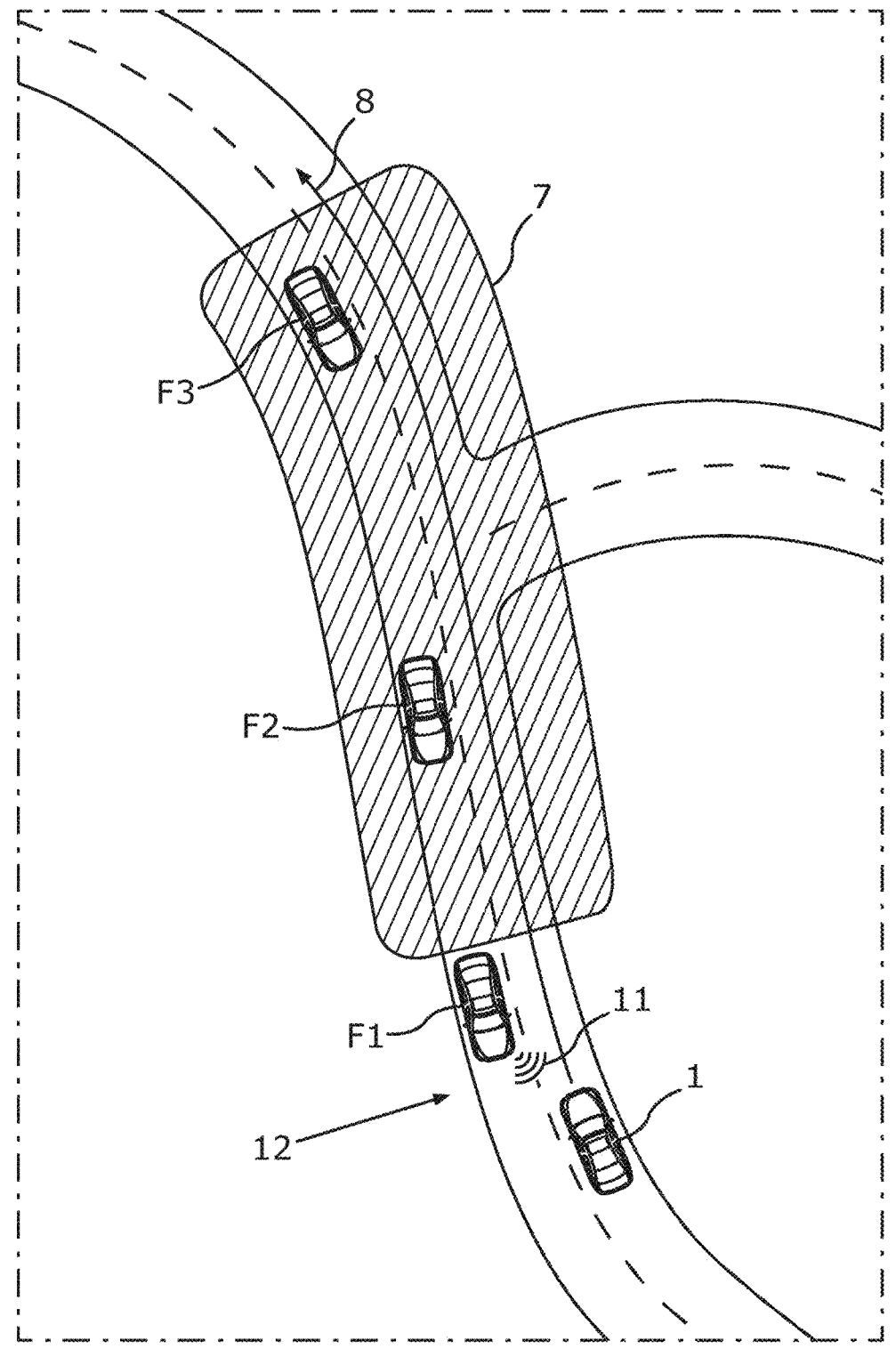
FIG. 3 is a schematic representation of the route region according to FIG. 2, wherein environmental data which comprise fleet data of two further vehicles is received.

FIG. 3 shows a schematic representation of the route region 7 according to FIG. 2. FIG. 3 additionally shows further vehicles F1, F2, F3. The further vehicles F1, F2, F3 are moving towards the vehicle 1 along the predetermined route 8. The further vehicles F1, F2, F3 pass the route region 7 or have already passed the route region 7. As they travel past 12, the further vehicles F1, F2, F3 (shown here using the example of vehicle F1) can transmit environmental data to the vehicle 1 via vehicle-to-vehicle communication 11. The environmental data can thus comprise fleet data, which describes a heating strategy of at least one further vehicle F1, F2, F3 within the route region 7. In the vehicle 1, in the simplest case, a counter can run which describes the percentage of vehicles which have an activated heating element 6. If the vast majority of the other vehicles F1, F2, F3 in the route region 7 must temperature control their sensor cover, the radome 5 or the sensor cover 5 can be pre-conditioned as a result of this information.

Figure 4:
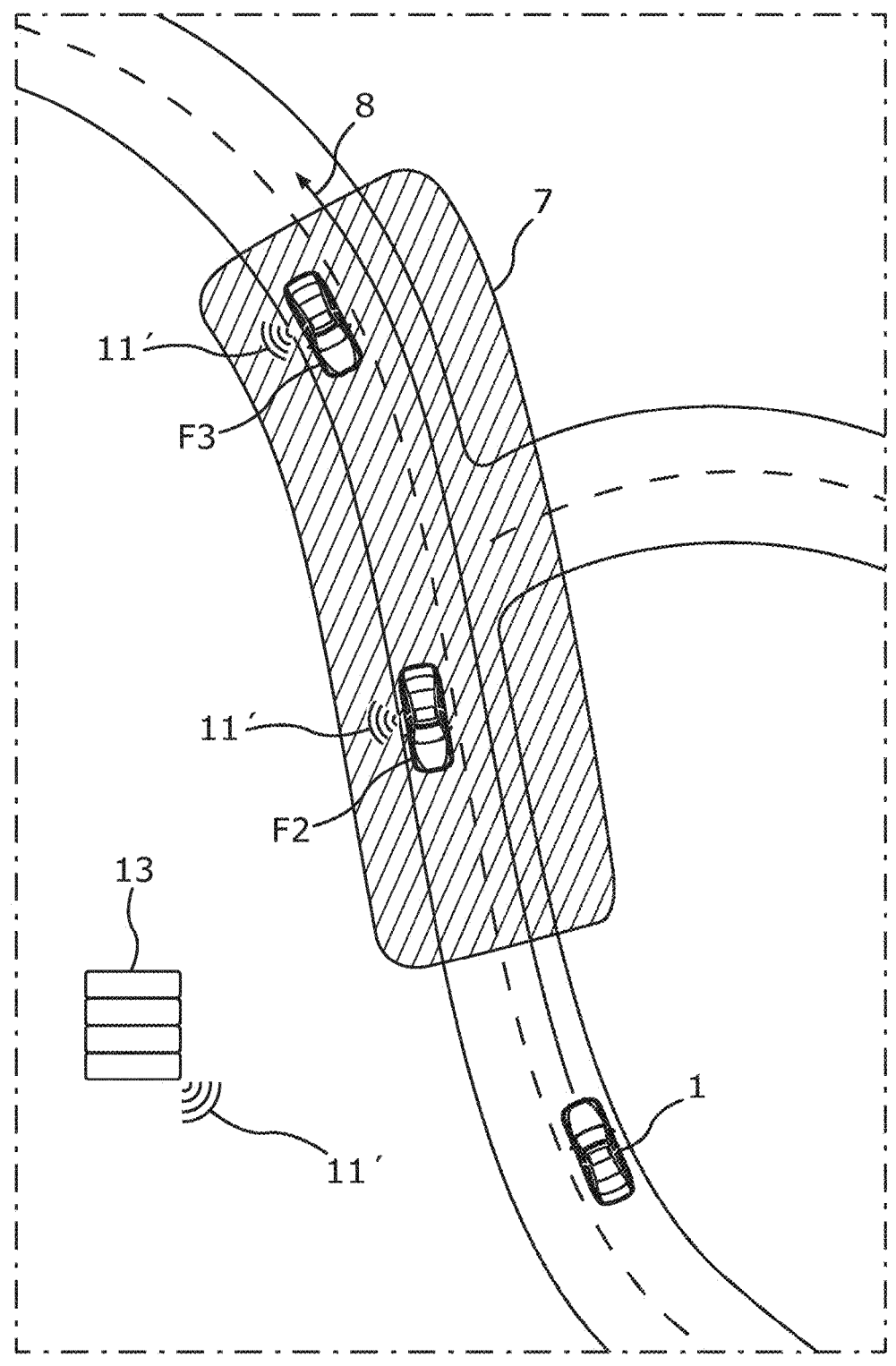
FIG. 4 is a schematic representation of the route region according to FIG. 3, wherein the fleet data is exchanged via a backend.

FIG. 4 shows a schematic representation of the route region 7 according to FIG. 3. In contrast to the vehicle-to-vehicle communication of the embodiment according to FIG. 3, the further vehicles F2, F3 can exchange a heating strategy by means of wireless communication 11' via a backend 13. The environmental data for the route region 7 can thus comprise fleet data (in some cases also processed fleet data).

The invention claimed is:

1. A method for pre-conditioning a temperature-controllable sensor cover of an environmental sensor of a vehicle, the method comprising the steps of:

determining a route region which describes a region of a future environment of the vehicle along a predetermined route;

receiving environmental data which comprise data relevant to a deposition of precipitation on the sensor cover within the route region; and outputting a heating signal for pre-conditioning the temperature-controllable sensor cover, wherein the heating signal is output depending on the environmental data, wherein additional plausibility data is received from at least one sensor of the vehicle, wherein the plausibility data describes characteristic parameters for precipitation in a current environment of the vehicle, and the heating signal is output depending on the plausibility data, and wherein the plausibility data comprises image data from a camera of the vehicle, and the image data describes at least one sky region and/or an ambient brightness.

2. The method according to claim 1, wherein a deposition of precipitation measure is additionally determined based on the environmental data, which describes a probability of a deposition of precipitation on the temperature-controllable sensor cover within the route region, and the heating signal is output depending on the deposition of precipitation measure.

3. The method according to claim 1, wherein the plausibility data comprises data from a light sensor of the vehicle, and

the data of the light sensor describes an ambient brightness.

4. The method according to claim 1, wherein the plausibility data comprises temperature data from a temperature sensor of the vehicle, and the temperature data describe an external temperature of a current environment of the vehicle.

5. The method according to claim 1, wherein the environmental data comprises weather data describing a current weather within the route region.

6. The method according to claim 1, wherein the environmental data comprises weather forecast data describing a predicted weather within the route region.

7. The method according to claim 1, wherein the environmental data comprises fleet data describing a heating strategy of at least one additional vehicle and/or a vehicle fleet within the route region.

8. A device for a vehicle, comprising:

a computing device operatively configured to:

determine a route region which describes a region of a future environment of the vehicle along a predetermined route;

receive environmental data which comprise data relevant to a deposition of precipitation on a sensor cover within the route region; and output a heating signal for pre-conditioning a temperature-controllable sensor cover, wherein the heating signal is output depending on the environmental data, wherein additional plausibility data is received from at least one sensor of the vehicle, wherein the plausibility data describes characteristic parameters for precipitation in a current environment of the vehicle, and the heating signal is output depending on the plausibility data, and

wherein the plausibility data comprises image data from a camera of the vehicle, and the image data describes at least one sky region and/or an ambient brightness.

9. A computer product comprising a non-transitory computer-readable storage medium having stored thereon program code which, during execution of the program code by a computing device, cause the computing device to:

determine a route region which describes a region of a future environment of the vehicle along a predetermined route;

receive environmental data which comprise data relevant to a deposition of precipitation on a sensor cover within the route region; and output a heating signal for pre-conditioning a temperature-controllable sensor cover, wherein the heating signal is output depending on the environmental data, wherein additional plausibility data is received from at least one sensor of the vehicle, wherein the plausibility data describes characteristic parameters for precipitation in a current environment of the vehicle, and the heating signal is output depending on the plausibility data, and wherein the plausibility data comprises image data from a camera of the vehicle, and the image data describes at least one sky region and/or an ambient brightness.

10. A temperature-controllable sensor cover system for an environmental sensor of a vehicle, comprising:

the device according to claim 8;

the sensor cover for the environmental sensor; and a heating element for pre-conditioning the temperature-controllable sensor cover based on the output heating signal.

11. A vehicle comprising the temperature-controllable sensor cover system according to claim 10.

* * * * *